US006857958B2

(12) United States Patent
Osawa

(10) Patent No.: US 6,857,958 B2
(45) **Date of Patent: *Feb. 22, 2005**

(54) GAMING MACHINE

(75) Inventor: Akira Osawa, Tokyo (JP)

(73) Assignee: Aruze Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/293,509

(22) Filed: Apr. 15, 1999

(65) Prior Publication Data

US 2003/0027622 A1 Feb. 6, 2003

(30) Foreign Application Priority Data

Apr. 15, 1998 (JP) ........................................... 10-104621

(51) Int. Cl.[7] ................................................ A63F 13/00
(52) U.S. Cl. ............................. 463/20; 463/27; 463/31
(58) Field of Search ............................. 463/20, 27, 31, 463/16–22; 273/143 R

(56) References Cited

U.S. PATENT DOCUMENTS

| | | | | |
|---|---|---|---|---|
| 4,570,934 A | | 2/1986 | Smyth | 273/143 |
| 4,624,459 A | | 11/1986 | Kaufman | 273/143 |
| 4,712,799 A | * | 12/1987 | Fraley | 273/138 A |
| 5,393,057 A | * | 2/1995 | Marnell, II | 273/85 CP |
| 5,560,603 A | | 10/1996 | Seelig et al. | 463/6 |
| 5,570,885 A | | 11/1996 | Ornstein | 463/27 |
| 5,586,766 A | * | 12/1996 | Forte et al. | 463/1 |
| 5,647,798 A | | 7/1997 | Falciglia et al. | 463/19 |
| 5,772,509 A | * | 6/1998 | Weiss | 463/16 |
| 5,788,573 A | | 8/1998 | Baerlocher et al. | 463/16 |
| 5,833,538 A | | 11/1998 | Weiss | 463/21 |
| 5,848,932 A | * | 12/1998 | Adams | 463/20 |
| 5,980,384 A | * | 11/1999 | Barrie | 463/16 |
| 5,984,781 A | * | 11/1999 | Sunaga | 463/20 |
| 6,004,207 A | * | 12/1999 | Wilson, Jr. et al. | 463/20 |
| 6,033,307 A | * | 3/2000 | Vancura | 463/20 |
| 6,203,429 B1 | | 3/2001 | Demar et al. | 463/20 |
| 6,234,897 B1 | | 5/2001 | Frohm et al. | 463/20 |
| 6,699,122 B1 | * | 3/2004 | Osawa | 463/20 |

FOREIGN PATENT DOCUMENTS

| | | | | |
|---|---|---|---|---|
| EP | 0 449 433 A | | 10/1991 | G07F/17/34 |
| GB | 2106685 A | | 4/1983 | G07F/17/34 |
| GB | 2222712 A | * | 3/1990 | |
| GB | 2242300 A | * | 9/1991 | |
| JP | 61-113488 | | 5/1986 | |
| WO | WO 96/22586 | | 7/1996 | G07F/17/34 |

* cited by examiner

*Primary Examiner*—Derris H. Banks
*Assistant Examiner*—Robert Mosser
(74) *Attorney, Agent, or Firm*—Leydig, Voit & Mayer, Ltd.

(57) ABSTRACT

A gaming machine has a variable display for displaying graphical information corresponding to a graphical element of a principal game; a controller coupled to the variable display for causing the variable display to display the graphical information; and a secondary display for displaying an image. The image of the secondary display is used in a secondary game that is different from the principal game, and is responsive to one of a plurality of predetermined principal game playing states. A player can win the secondary game and the principal game in the variable display. The images in the secondary display constitute a history of the predetermined states that have been presented in the variable display during the principal game.

12 Claims, 15 Drawing Sheets

ONE AREA CLEAR SYSTEM

ALL AREA CLEAR SYSTEM

MULTIPLIED ALLOTMENT SYSTEM

ADDED ALLOTMENT SYSTEM

GAMING MACHINE

BACKGROUND OF THE INVENTION

1. Field of the Invention

This invention relates generally to gaming machines, and more particularly to gaming machines such as a slot machine, a "Pachi-Slo," a video poker, or the like that have a variable display for displaying image information representative of a plurality of symbols necessary for a game and a controller such as a microcomputer for controlling the variation action of the variable display.

2. Description of the Related Art

A gaming machine such as a slot machine or a "Pachi-Slo" usually has a mechanical variable display formed of rotatable display elements that are provided with a plurality of symbols disposed on peripheral surfaces thereof. The symbols are visible through a display window at the front of the slot machine. Alternatively, an electrical variable display is formed of indicating elements with symbols on a display screen. In response to a "start" operation by a player, a controller drives the variable display to start the rotation of each rotatable display element and to stop the rotation of each rotatable display element in a determined sequence automatically after a predetermined period of time has elapsed, or in response to initiation of a "stop" operation by the player. When the rotation of all of the rotatable display elements has ceased, there is shown a specific combination of symbols (winning pattern) in the display window. The player is then given an award by paying out gaming medium such as coins.

In a popular model of a slot machine, a "win" corresponding to a predetermined plurality of winning symbols being completely positioned on the winning line of the display when rotation of the rotatable display elements ceases occurs only when a win has been established by a system internal to the gaming machine. In a practical machine, this happens when a sampling operation of a random number issued by a microcomputer has been determined to constitute a win.

However, because a result (i.e., win or loss) of the game is determined by an internal procedure of the gaming machine, the skill of the player is not reflected in the game result and the game itself becomes monotonous. As the result, there is a problem that the player tends to tire and loses interest in playing another game.

One known approach to alleviating the aforementioned problem of the gaming machine is to provide a gaming machine having a variable display and a further display, which such as a liquid crystal display or the like, by which a secondary game that is different from the principal game by the reels is played. One known approach employs a virtual race game wherein three kinds of special symbols are established for the principal game and three kinds of secondary images corresponding to the three kinds of special symbols, respectively, are established for the secondary game. Whenever one of the special symbols stands on a winning line, the secondary image corresponding to that special symbol is moved on the liquid crystal display whereby it competes with the other secondary images. That is, the frequency of appearance of each special symbol causes its corresponding secondary image to move along the further display at a corresponding rate. The secondary images appear therefore to race, and when one of the secondary images reaches a predetermined position, the player wins an award.

In the known gaming machine described hereinabove, however, the secondary game proceeds simply when a special symbol of the principal game stands on the winning line. In other words, the secondary game proceeds with no relation to the result of the principal game. Accordingly, when a player endeavors to win the principal game, i.e., by the rotatable reels, the secondary game oftentimes proceeds without being noticed by the player. The player therefore does not achieve a sense of relationship between the principal game and the secondary game, and the player's enthusiasm to play to the gaming machine is not raised.

SUMMARY OF THE INVENTION

An object of this invention is to provide a gaming machine wherein a player can earn a profit or receive an award that is increased in response to a secondary game that is played supplemental to a principal game. The secondary game is effected in a variable, or secondary, display that variably displays a plurality of symbols that are used in the principal game, whereby the player achieves a feeling of high excitement to win the principal game, the feeling of expectation being enhanced by the secondary game which proceeds in response to a predetermined state of the principal game.

According to this invention, there is provided a gaming machine for use by a player, the gaming machine having: a variable display for displaying graphical information corresponding to at least one of a plurality of graphical elements necessary for a principal game; a controller coupled to the variable display to display the graphical information; and a secondary display for displaying an image, the image displayed by the secondary display being necessary for playing a secondary game that is different from the principal game. Moreover, the secondary display displays the image when the playing of the principal game results in one of a plurality of predetermined principal game playing states.

The predetermined state includes, for example, a predetermined display that is shown when the variation action (e.g., the rotating reels) of the variable display is stopped. In other words, a predetermined winning combination of symbols (winning pattern) of the principal game and a combination of symbols (pattern) are predetermined to cause a particular symbol image to be shown on the secondary display.

The controller controls variation action of the variable display in gaming time. The result of the game, that is, "win" or "loss," appears depending upon the pattern that is shown at the time when the variation action has stopped. The secondary display presents an indication that is necessary for playing the secondary game, the secondary game being different from the principal game performed by the variable display. The indication in the secondary display appears when the variation in the action of the variable display is stopped and the principal game results in any one of a plurality of predetermined states. Consequently, a player of this novel gaming machine enjoys the possibility of winning the secondary game in addition to the principal game. Further in accordance with the invention, the indication in the secondary display is a display of a record of the history of predetermined states that have resulted during the playing of the principal game.

In a preferred embodiment, the secondary game includes a game whereby the player can obtain an award when a plurality of predetermined images are arranged either in a certain direction or at predetermined positions in the secondary display.

The secondary display may include an electric display, such as liquid crystal, CRT, or LED, or combinations thereof, as well as mechanical displays having rotating display elements of structure as are used in conventional slot machines. The image displayed by the secondary display includes those indicated electrically such as various kinds of letters and figures, animations, light(s) flashing on and off, and the like, as well as those drawn on a reel surface such as symbols or patterns.

In a particularly advantageous embodiment, the secondary display is provided with a secondary display screen that indicates a plurality of individual symbol images, each such symbol image corresponding to a respectively associated one of the predetermined principal game playing states. Each symbol image is displayed on the secondary display screen when the principal game results in its respectively associated principal game playing state. Consequently, the secondary game can correspond to the result of the game by the variable display. A player would endeavor to stop the variation action at a winning state that is profitable for the secondary game, while simultaneously endeavoring to win the principal game. It is a particular advantage of the present invention that amusement shops can easily regulate the frequency of execution of the secondary game by adjusting the frequency of appearance of the predetermined state.

In one embodiment, the number of symbol images that are displayed on the secondary display screen is responsive to the resulting predetermined game playing state, so that a player can enjoy an effort at a "winning pattern" whereby a large number of symbol images are indicated at once on the secondary display screen when the principal game is executed by the variable display.

In another embodiment, the secondary display screen is provided with a plurality of display areas each for displaying a respective plurality of a particular associated one of the symbol images. Each of the display areas are adapted to display the plurality of the respectively associated symbol image successively alongside each other, so that a player can maintain awareness of the condition of the secondary game by watching the symbol images as they are indicated successively.

In a further embodiment it is determined that a player can earn a profit or receive an award when the information displayed on the secondary display screen satisfies a predetermined condition. The predetermined condition includes, for example, completion of the secondary game, as would be the case when any of the display areas is shown as being filled with successive symbol images. Such a filling of a display area constitutes, in this specific illustrative embodiment of the invention, a win of the secondary game. In this embodiment, the player can enjoy the secondary game like a "race game" in which the accumulation of the respective symbol images compete to reach right-hand terminals of each display areas, which are each assumed to be a goal. The secondary game has an aspect of a "race game," as mentioned above, and additionally provides an indication of the history of appearance of the predetermined states of the primary game, as mentioned above. The player can easily recognize what kind of the predetermined state furthers the likelihood of winning or losing the secondary game by observing the area or number of the symbol image indicated.

Accordingly, in the progress of the secondary game, when a profitable state as to a specific symbol image is close, the player expects that the stop display of the principal game may become a pattern for indicating the specific symbol image of the secondary game.

There are provided in the practice of the invention various secondary games, some of which may be responsive to effecting a change in the amount of the award given to the player in response to the kind of the symbol images that are indicated in the display area being filled.

In a preferred embodiment, the controller executes a reset operation of the secondary display screen when the secondary screen indicates that the predetermined condition has been satisfied. In a single area clearing system, a display area filled with symbol images is cleared to a blank condition in response to the execution of the reset operation. In an all areas clear system, all of the display areas are cleared to a blank condition in response to the execution of the reset operation. In an optional selection system, the controller is arranged to select between a reset operation for clearing to a blank condition only a single display area containing symbol images or a reset operation for clearing to a blank condition all of the display areas.

When the reset operation of the one area clear system is executed, the player can maintain an expectation to be awarded a further profit if the symbols indicated in the remaining areas, i.e., the areas other than the cleared area, are close to completion of the second game, which if completed would constitute a profitable condition for the player, even after the player had obtained an award via the secondary game. However, when the reset operation of the all areas clear system is executed, the player knows that the completion of the secondary game is not close because the secondary game restarts.

When the reset operation of the optional selection system is executed, the player expects that a profitable reset operation, such as the one area clear system, may be executed after completion of the second game. The progress and result of the secondary game can be varied by regulating the frequency of appearance of each such system.

In accordance with a further specific illustrative embodiment of the invention, the second display preferably has an allotment display portion that indicates a value that represents an allotment given to a player by the secondary game in response to the various kinds of symbol images. The value corresponding to the symbol image in the display area filled therewith is changed to a new value produced by a selectable one of a multiplication by, or an addition of, a predetermined number, relative to the previous value after the reset operation. The player therefore can maintain an expectation of receiving an award of a profit because the allotment by the secondary game is increased even if the symbol images have disappeared by the reset operation after the completion of the second game.

In accordance with the present invention, the probability of winning, and the allotment as a whole, can easily be regulated by adjusting the frequency of appearance of the symbols necessary for the secondary game indicated when the variation action of the variable display of the principal game is stopped.

BRIEF DESCRIPTION OF THE DRAWING

The foregoing and other objects, features, and advantages of the invention will become more apparent from the following detailed description taken in conjunction with the accompanying drawings, in which.

DETAILED DESCRIPTION

Figure 1:
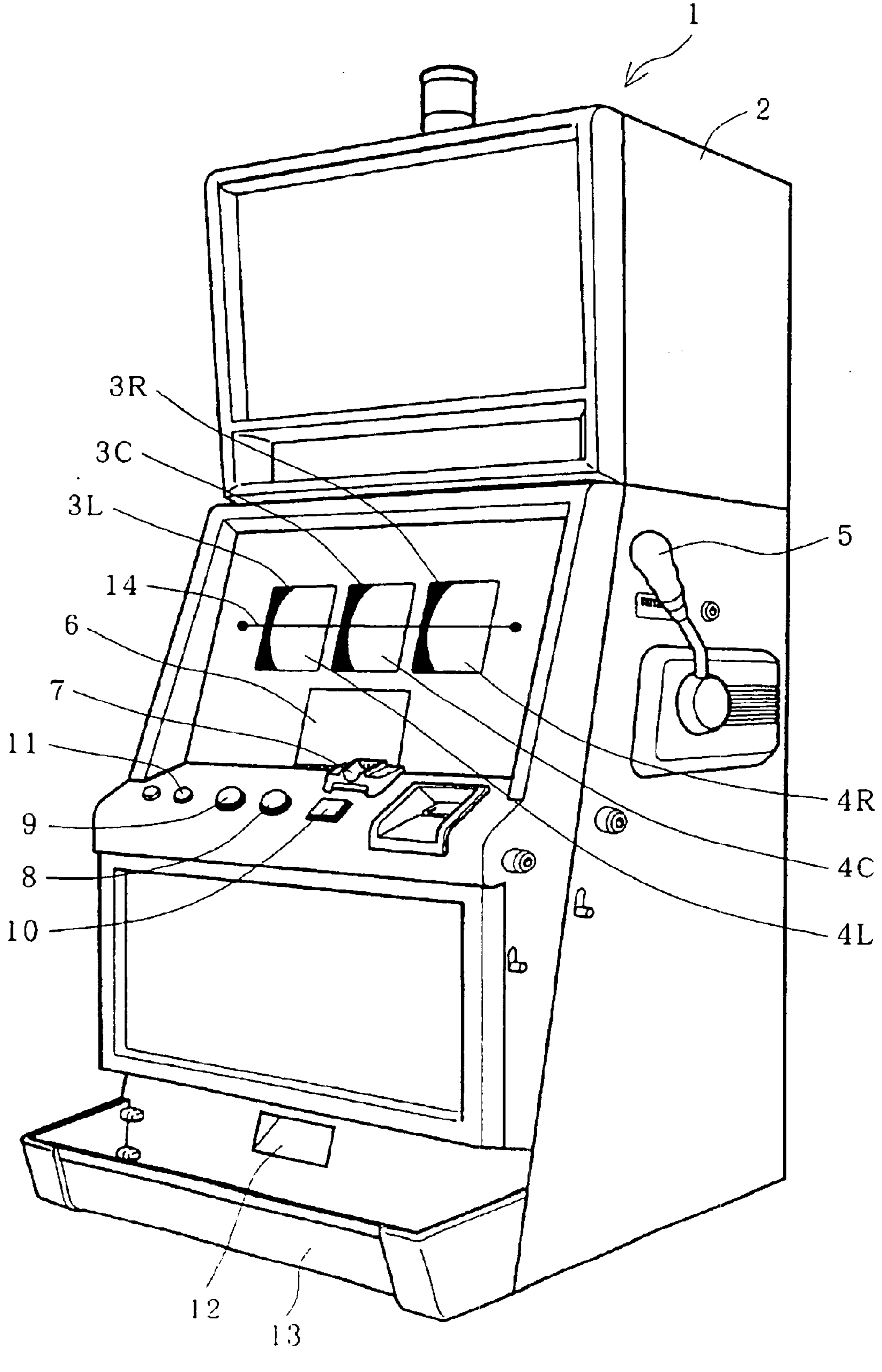
FIG. 1 is an isometric representation of a specific illustrative embodiment of the invention in the form of a slot machine.

FIG. 1 is an isometric representation of a specific illustrative embodiment of the invention in the form of a slot machine 1. Slot machine 1 is a gaming machine that is played using a coin, a medal or a token (not shown), and the like as game media. Hereinafter, the game media will be referred to as "coins."

Figure 2:
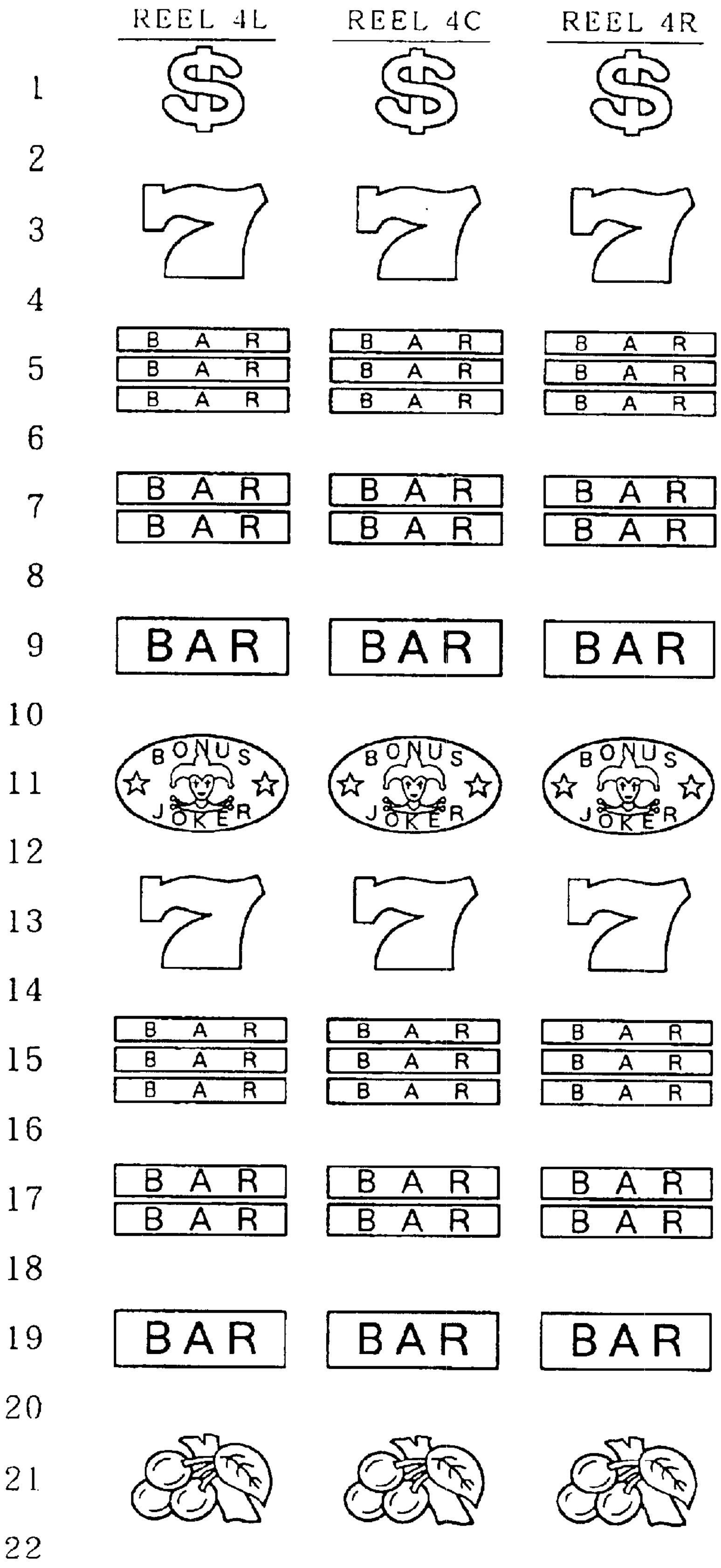
FIG. 2 is a representation of a specific arrangement of symbols that are to be positioned on the periphery of rotatable reels (not shown in this figure) of a variable display device.

On the front face of a cabinet 2 forming a housing for slot machine 1, three display windows 3L, 3C, and 3R are arranged in a horizontal line. Additionally, various kinds of symbols (not shown in this figure) are displayed on the central winning line 14 or its upper and lower positions of each display window, as will be described later with respect to FIG. 3. As shown in FIG. 2, these symbols are drawn on the surface of the sheet that is applied to form peripheral planes of rotatable reels 4L, 4C, and 4R, and which are arranged inside of cabinet 2 in predetermined relation to display windows 3L, 3C, and 3R. In the embodiment shown in FIG. 2, there are twenty-two positions on the surfaces of each sheet arranged longitudinally. In the odd positions, there are arranged a plurality of symbols, that include symbols for forming a winning combination (winning pattern) such as "7," "BAR," or the like, as well as other symbols. The even position remains "blank."

The rotatable reel on the peripheral surface of which is installed a reel sheet of FIG. 2 is a mechanical moving display element, which is an embodiment of the variable display member that forms the variable display of the gaming machine of this invention. Alternative embodiments of the variable display member include an electric variable display arrangement that can display various ones of the symbols and images on a CRT display screen or a liquid crystal display.

On the side surface of cabinet 2 there is provided a lever 5 for rotating the rotatable reels in response to actuation by a player (not shown). Lever 5 is arcuately displaceable within a predetermined range of angular motion.

A liquid crystal display 6 is provided as an illustrative secondary display located at the center of the display windows of the front face of cabinet 2.

The display screen of liquid crystal display 6 has a symbol image display portion 6*a* on the left side and a coin allotment display portion 6*b* on right side. Symbol image display portion 6*a* and coin allotment display portion 6*b* are divided into upper, middle and lower sections by two lines running in a side direction. In other words, symbol image display portion 6*a* consists of upper display area 6*a*1, middle display area 6*a*2 and lower display area 6*a*3. For each display area, a symbol image to be indicated is previously determined. Coin allotment display portion 6*b* consists of display portions 6*b*1, 6*b*2 and 6*b*3 corresponding to the display areas mentioned above, respectively. In this example, symbol image "7" is indicated in display area 6*a*1, symbol image "3 BAR" is indicated in display area 6*a*2, and symbol image "2BAR" is indicated in display area 6*a*3. In each of display portion 6*b*1, 6*b*2 and 6*b*3 is indicated a coin allotment corresponding to each symbol image to be indicated in each display area. Indication of each symbol image is started at a predetermined condition as described below. A plural number of the symbol images can be indicated one-by-one successively from left to right as viewed from the front. When any one of the three display areas is filled with the symbol images, a predetermined number of coins is paid out to the player, as will be described in detail later.

Beneath liquid crystal display 6, there are provided a coin entry slot 7 where coins of game media are inserted, a spin switch 8 for starting the rotatable reels mentioned above by button-pushing operation as an alternative to the actuation of start lever 5, a 1-BET switch 9 for betting only one coin credited on a game to allow a one-time button-pushing operation, a maximum BET switch 10 for betting maximum numbers of coins that can be bet on one time of game, and a C/P switch 11 for changing credit/pay out of coins acquired by the player as a result of the button-pushing operations. Beneath the front face of cabinet 2 there is provided a coin tray 13 for saving coins paid out via a coin chute 12 in response to the actuation of C/P switch 11.

Figure 4:
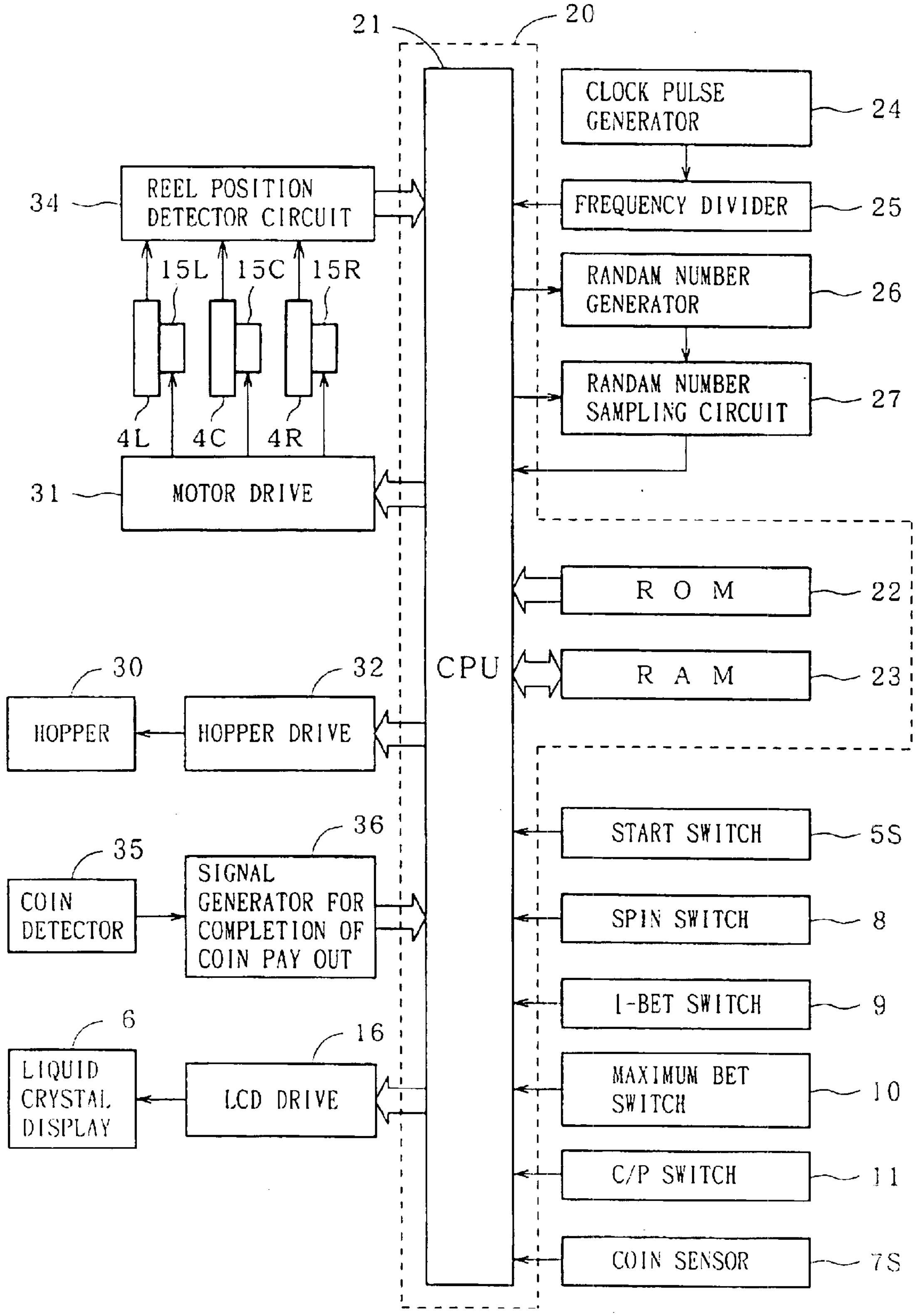
FIG. 4 is a block diagram of a circuit arrangement used in the slot machine of FIG. 1.

FIG. 4 shows a circuit construction that includes a controller for controlling operation procedure of games in slot machine 1 and peripheral equipment, i.e. actuators that are electrically connected thereto.

In this specific illustrative embodiment of the invention, control is effected by a microcomputer 20 and a random number sampling circuit 27 that is coupled thereto. Microcomputer 20 includes a CPU 21 that executes control operations according to a preset program, and a ROM 22 and a RAM 23 as system memory. CPU 21 has connected thereto a clock pulse generator 24 for generating a reference clock pulse, a frequency divider 25, a random number generator 26 for generating random numbers to be sampled, and previously mentioned random number sampling circuit 27. The random number sampling may be executed in microcomputer 20, i.e. in an operation program of CPU 21. In such a case, random number generator 26 and random number sampling circuit 27 either would not be provided as discrete systems, or they would be used to backup the random number sampling operation.

In ROM 22 of microcomputer 20, in addition to the game control system for the slot machine, there are stored information and data necessary for executing procedures to indicate plural numbers of display images described later on the screen of liquid crystal display 6.

In the circuit of FIG. 4, operations of main actuators are controlled by control signals from microcomputer 20. The main actuators include stepping motors 15L, 15C, and 15R for driving each reel 4L, 4C, or 4R mentioned above, a hopper 30 (including a driver for pay out) that accommodates coins of game media and above-mentioned display screen. These actuators are each connected to the outputs of CPU 21 via a motor drive circuit 31, a hopper drive circuit 32 and a liquid crystal drive circuit 16, respectively. These drive circuits receive control signals such as driving commands outputted from CPU 21 and control the operations of the actuators, respectively.

Furthermore, the input signals necessary for microcomputer 20 to generate control signals are provided by coin sensor 7S that detects coins (not shown) inserted into coin entry slot 7, a start switch 5S that detects the operations of start lever 5, spin switch 8, 1-BET switch 9, maximum BET switch 10, C/P switch 11, reel position detector circuit 34 for receiving pulse signals from the reel rotation detector of the variable display and supplying signals for detecting the position of each reel to CPU 21, and signal generator 36 for completion of coin pay out supply signals to CPU 21 when the counted value of coin detector 35 for detecting coins paid out from hopper 30 reaches the predetermined number, which are connected to respective inputs of CPU 21.

In the circuit of FIG. 4, random number generator 26 generates random numbers in a predetermined range of numerical values, and sampling circuit 27 samples one random number within a predetermined time period after start lever 5 has been operated. The random number thus sampled is evaluated to determine whether it pertains to the predetermined winning area stored in the memory portion of ROM 22, and if it does pertain to the winning area, a "winning request signal" is generated.

After rotatable reels 4L, 4C, and 4R have been driven into rotation, the number of driving pulses supplied to each of stepping motors 15L, 15C, and 15R is counted, and the counted value is written in a predetermined area (not shown) within RAM 23. A reset pulse is delivered from reels 4L, 4C, and 4R during every rotation, and these pulses are provided to CPU 21 via reel position detector circuit 34. CPU 21 clears the counted value of the driving pulses stored in RAM 23 to "0" by a reset pulse delivered in this manner. Thus, the counted value corresponding to a rotation position in a range of one rotation with respect to each of rotatable reels 4L, 4C, and 4R is stored within RAM 23.

A symbol table (not shown) is stored within ROM 22 and contains the rotation positions of rotatable reels 4L, 4C, and 4R, and the symbols (not shown in this figure) are correlated to such rotational positions. In addition, a winning symbol combination table is stored within ROM 22. In this winning symbol combination table are stored data corresponding to the winning symbol combinations, the numbers of coins of dividend for winnings, and the winning determination codes that represent the winnings. The winning symbol combination table is accessed when control over rotatable reels 4L, 4C, and 4R is being executed, and the winning confirmation is executed after all rotatable reels have been stopped.

In addition, within ROM 22, there are stored a plurality of image display data for executing the secondary game mentioned later by liquid crystal display 6.

Figure 5:
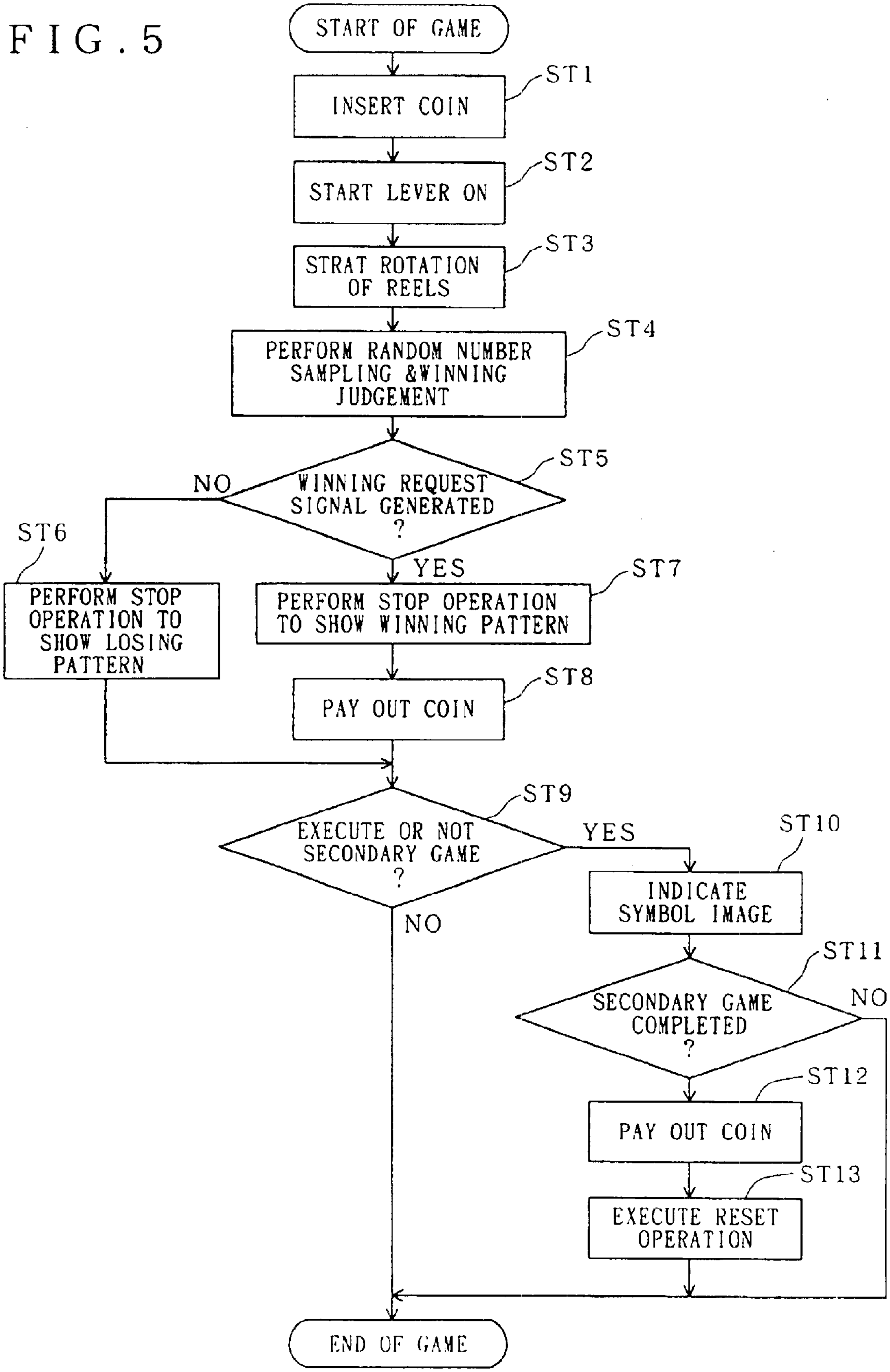
FIG. 5 is a flow chart showing a portion of the control operation of a specific illustrative embodiment of the invention.

FIG. 5 is a flow chart showing an example of a procedure for executing a principal game (first game) using rotatable reels 4L, 4C, 4R and a game (secondary game) that employs liquid crystal display device 6, that is executed separately from the principal game. In the figure, step numbers of the operation procedure are indicated by ST1, ST2, etc.

The procedure is executed by CPU 21 within microcomputer 20 used for the game controlling arrangement of slot machine 1. However, when the display arrangement, such as liquid crystal display device 6, is itself provided with a CPU as a display controller, such a CPU may be used to determine the display image depending on a display command (e.g., display commands corresponding to the types of wins or losses) from CPU 21 of the game controller.

Referring to FIG. 5, in the beginning state, the gaming machine (slot machine 1) has been supplied with power. A player performs necessary operations. The player inserts coins into coin entry slot 7 (ST1), and then operates start lever 5 or spin switch 8 (ST2) after operation of 1-BET switch 9 or the maximum BET switch 10. Reels 4L, 4C, and 4R are caused to rotate and the variable display is started (ST3). At this time, the determinations of winning/not winning and type of stop pattern (combination of symbols) are executed based on the random number extracted by random number sampling (ST4). Thereafter, it is judged whether the inning request signal is generated (ST5). Depending on the result of the judgement, the stop control of the rotation of reels 4L, 4C, 4R is executed. When the winning request signal is generated, the stop control is executed so as to indicate a winning pattern (combination of the symbols) (ST7) and when the result of the determination is "NO," that is, when the winning request signal is not generated, the stop control is executed so as to indicate a pattern (combination of the symbols) showing "loss" (ST3).

In the procedure mentioned above, the variable display of ST3 is effected by CPU 21 supplying driving signals to motor drive 31, and thereby driving stepping motors 15L, 15C, and 15R, and rotating reels 4L, 4C, and 4R. In addition, the winning judgement of ST4 is realized by a random number that is sampled from random number generator 26 on a suitable timing and the value of a random number extracted is evaluated to determine the group to which it belongs, in the predetermined winning area. When the result of the determination is "NO," CPU 21 delivers signals for controlling to stop rotation of reels 4L, 4C, and 4R at the symbol display positions corresponding that corresponding to a kind of "loss" to motor drive 31. When the result of the determination is "YES," CPU 21 delivers signals for controlling to stop rotation of reels 4L, 4C, and 4R at the symbol display positions corresponding that corresponding to a kind of "win" to motor drive 31 (ST7).

CPU 21 delivers coin pay out command signals corresponding to the various types of win to a hopper drive circuit 32, and executes the pay out of predetermined number of coins from hopper 30 (ST 8). At this time, a coin detector 35 counts the number of coins paid out from hopper 30, and when the counted value reaches the predetermined number data, the coin pay out completion signal generator circuit 36 generates coin pay out completion signals that are inputted to CPU 21. CPU 21 stops the drive of hopper 30 via hopper drive 32, thereby completing the procedure of paying out coins.

In addition, CPU 21 determines whether or not the secondary game is executed, and more specifically, whether or not the pattern (combination of the symbols) indicated as stop pattern is a pattern (combination of the symbols) predetermined so as to cause indication of a corresponding symbol image on liquid crystal display device 6 (ST 9).

In this case, the secondary game is executed only when one of the patterns of the principal game performed by the variable display (i.e., combinations of the symbols such as "7-7-7" and others) is one that has been predetermined from all patterns to execute an indication for the secondary game stands in the central winning line in display windows 3L, 3C, 3R as stop pattern.

Figure 6:
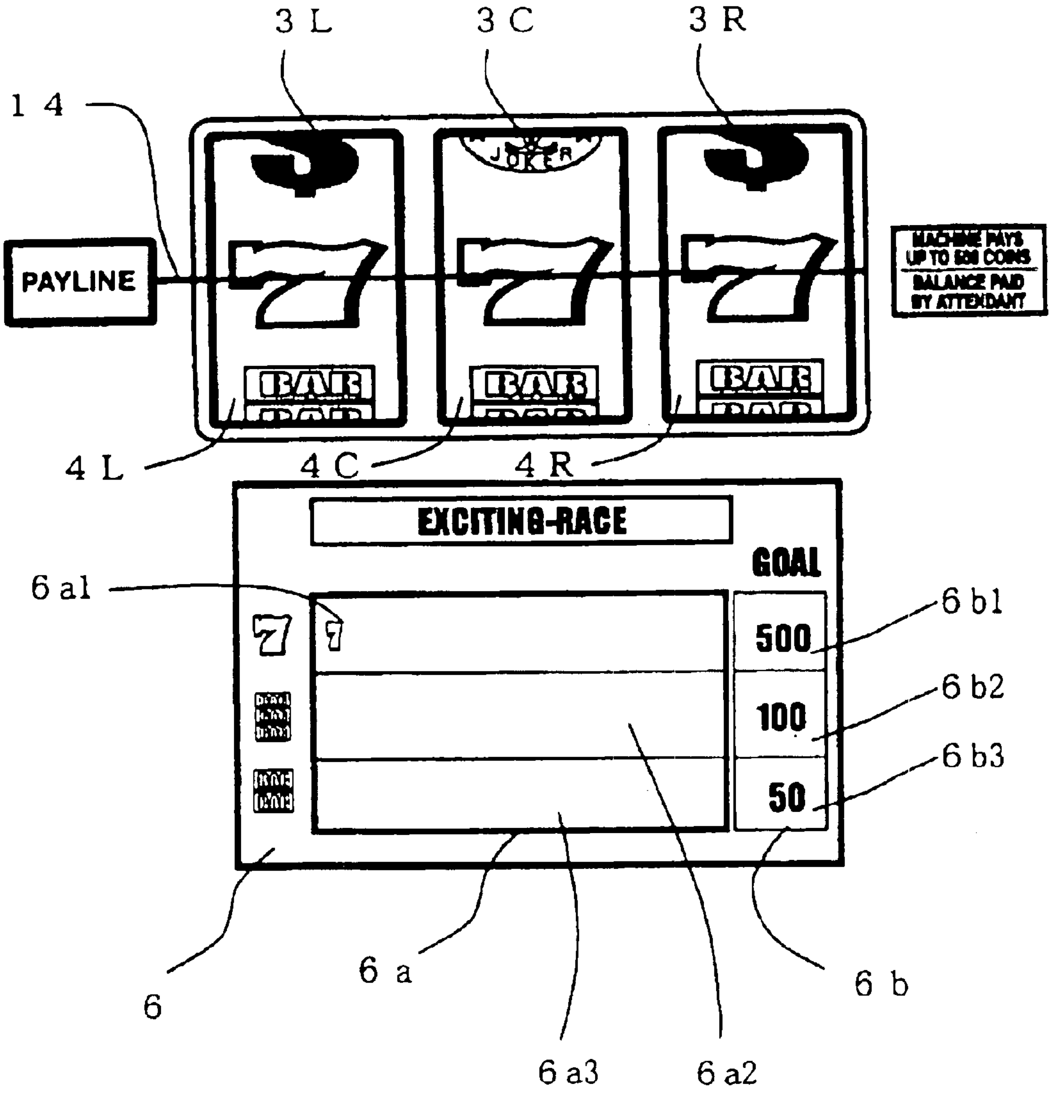
FIG. 6 is a representation that illustrates a predetermined winning state that employs the symbol "7" at the time the variable display has been stopped, and an indication of the predetermined state as a symbol image "7" in a symbol image display portion of the liquid crystal display device.

When the determination of ST9 is "YES," a symbol image selected from the predetermined symbol images is indicated in a display area corresponding to the symbol image selected from display areas 6*a*1, 6*a*2, 6*a*3 of symbol image display portion 6*a* (ST10). For example, as shown in FIG. 6, one of symbol image "7" that looks like the symbol "7" shown on the reels is indicated in upper display area 6*a*1 of symbol image display portion 6*a*.

On the other hand, when the determination of ST9 is "NO," the game becomes end without execution of the secondary game.

Then, a determination is performed (ST11) whether the secondary game has become complete or not. The condition for completion of the secondary game includes, for example, a condition where any one of the display areas is filled with the symbol images (the display area does not have space for indication of the symbol image any longer) by repeated indications of the symbol images.

Figure 3:
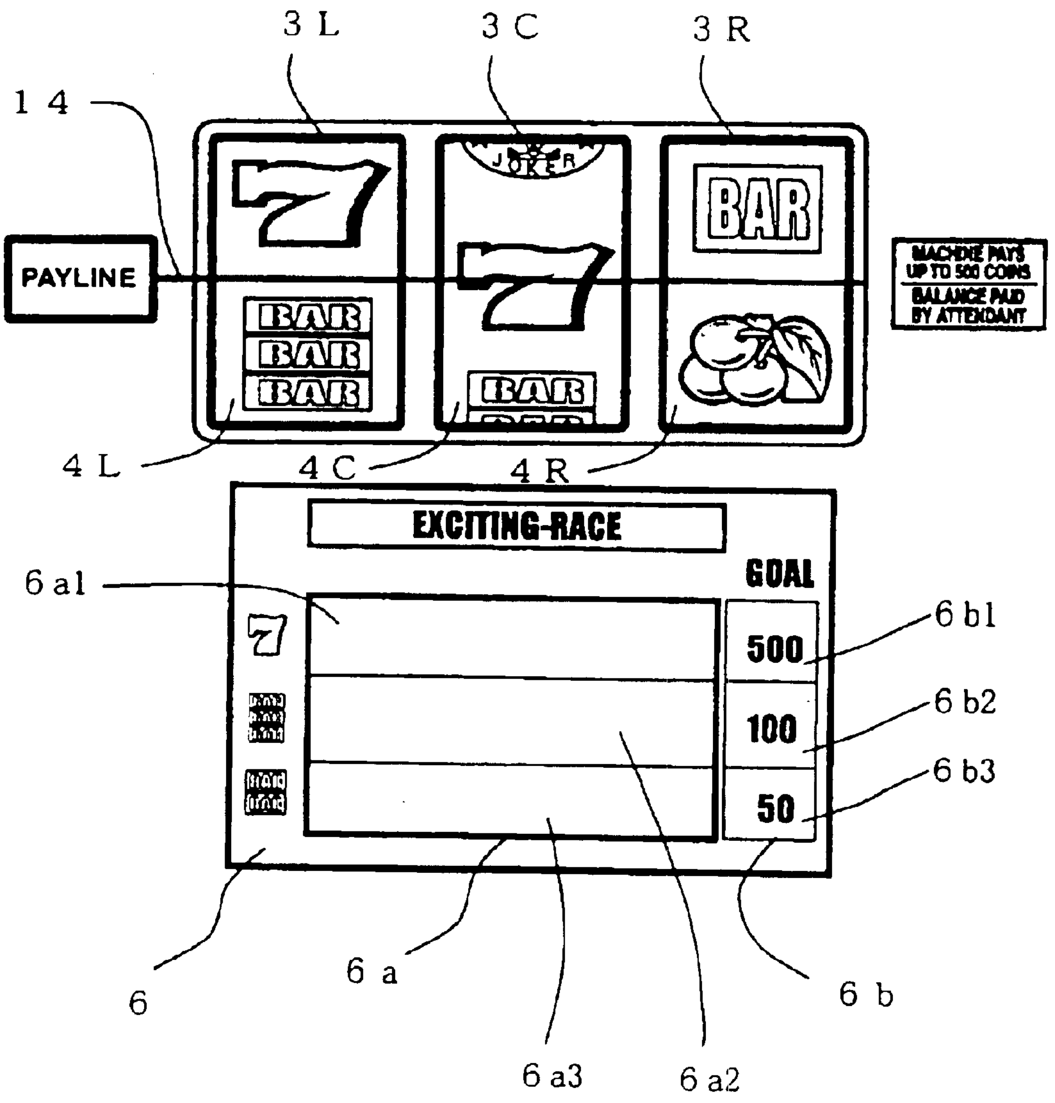
FIG. 3 is a representation of the frontal appearance of the variable display device and a liquid crystal display device.

When the result of the determination of ST11 is "YES," coin pay out command signals are delivered to hopper drive circuit 32, thereby paying out predetermined number of coins from hopper 30. Although the number of coins to be paid out may be fixed to a certain number, it may be varied corresponding to the kind of symbol image. For example, as shown in FIG. 3, in the case where the secondary game is completed by the symbol image "7" the number of coins to be paid out is 500, in the case of the symbol image "3BAR" the number is 100, and in the case of the symbol image "2BAR" the number is 50, respectively. Accordingly, interest of the secondary game can be enhanced much.

When the result of the determination of ST11 is "NO" the game is ended while the indication of liquid crystal display 6 remains unchanged.

After completion of coin pay out operation of ST12, CPU21 executes a reset operation of symbol image display portion 6*a* (ST13) for a game to be played next, thereby indicating a reset screen in symbol image display portion 6*a* to end the game.

As the reset operation, there are provided two kinds of reset operations, specifically a "one area clear system" (referring to FIG. 10, detail will be described later) by which only the display area filled with the symbol images is cleared from the symbol images to blank, and an "all areas clear system" (referring to FIG. 11, detail will be described later) by which all of the display areas are cleared from the symbol images to blank. CPU 21 executes the reset operation by selecting one system from these two systems according to random number sampling. Of course, the execution of the reset operation may be limited to one of both systems. Also, there may be provided a manually operable member for selecting a reset operation by a player's operation.

Also, as to the symbol image indicated in the display area filled therewith, number of coin allotment may be changed by multiplication or addition (referring to FIGS. 12 and 13, which will be described later).

Next, there will be explained symbols shown in display windows 3L, 3C, 3R as described above and symbol images indicated in display areas 6*a*1, 6*a*2, 6*a*3 of the symbol image display portion 6*a*, of liquid crystal display 6.

FIG. 6 shows a state when rotations of three reels 4L, 4C, 4R are respectively stopped. At this time, three symbols of "7" stand in winning line 14 of display windows 3L, 3C, 3R to show a winning state. This winning pattern "7-7-7" is a predetermined state that causes the secondary game to be executed. In this case, one symbol image of "7" is indicated in upper display area 6*a*1 of symbol image display portion 6*a*.

Figure 7:
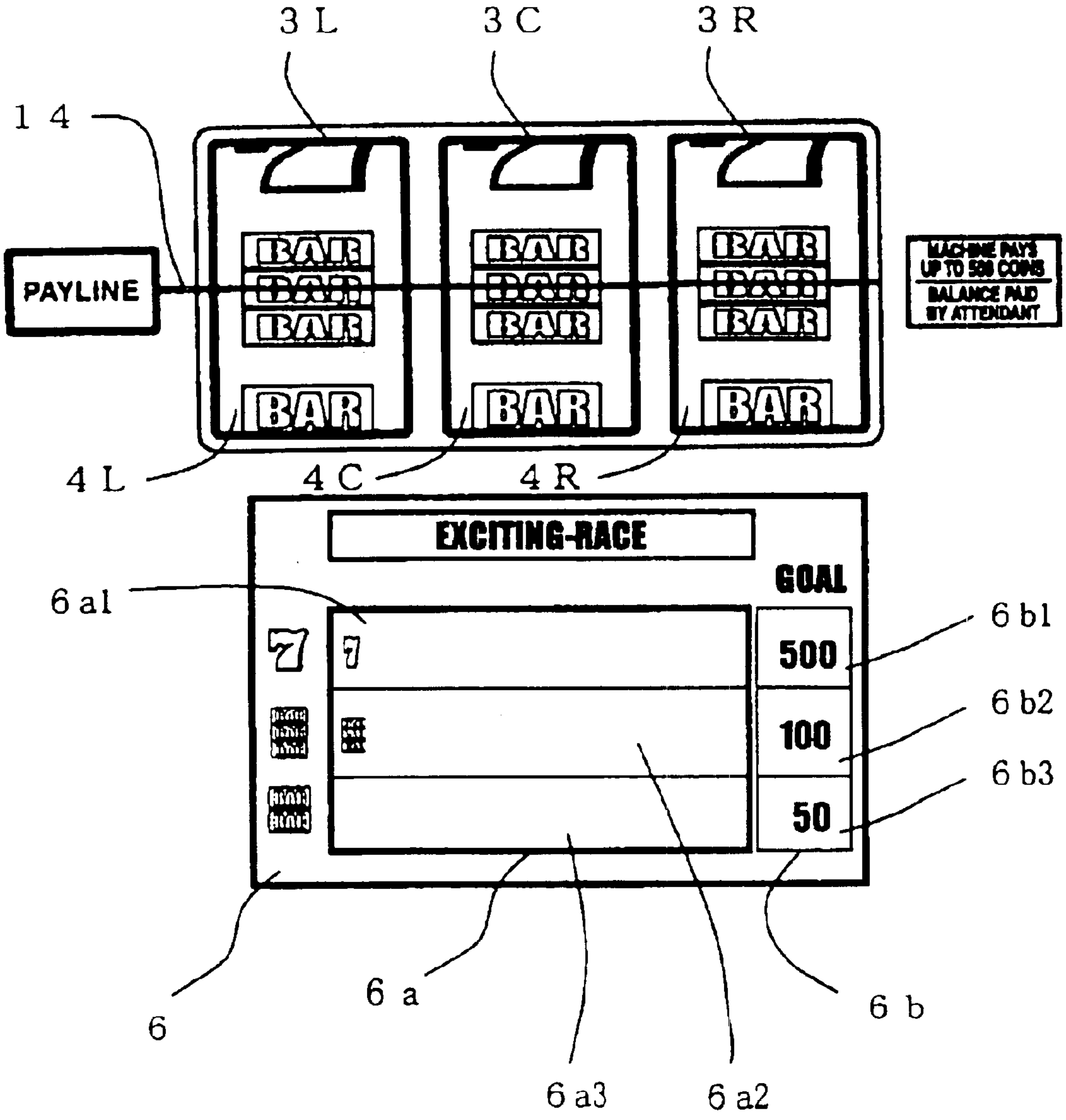
FIG. 7 is a representation that illustrates a predetermined winning state that employs the symbol "3BAR" at the time the variable display has been stopped, and an indication of the predetermined state as a symbol image "3BAR" in a second symbol image display portion of the liquid crystal display device.

FIG. 7 shows a winning state where three symbols of "3BAR" stand in winning line 14 of the display. This winning pattern "3BAR-3BAR-3BAR" is also a predetermined state that causes the secondary game to be executed. In this case, one symbol image of "3BAR" is indicated in middle display area 6*a*2 of symbol image display portion 6*a*.

Figure 8:
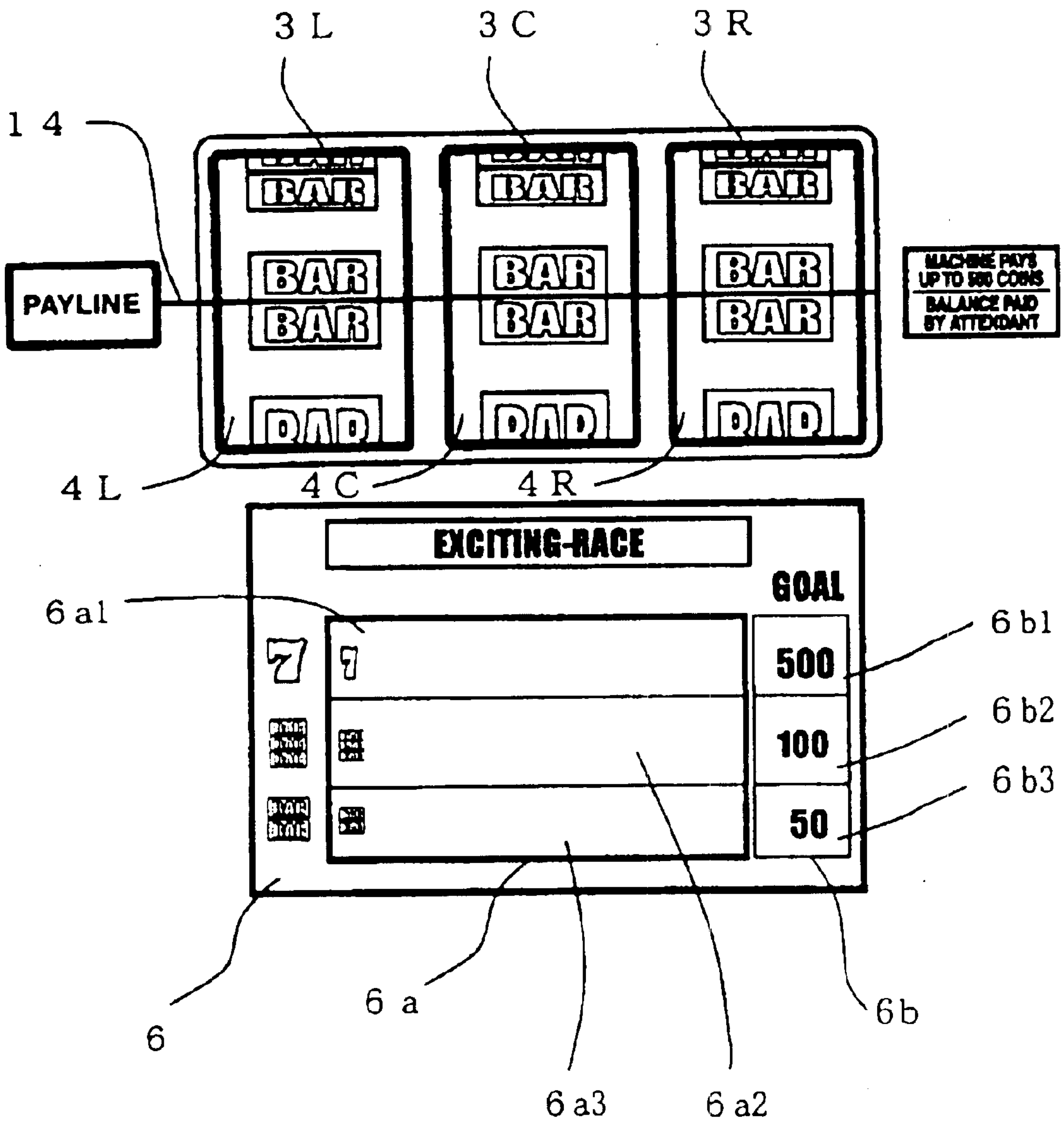
FIG. 8 is a representation that illustrates a predetermined winning state that employs the symbol "2BAR" at the time the variable display has been stopped, and an indication of the predetermined state as a symbol image "2BAR" in a third symbol image display portion of the liquid crystal display device.

FIG. 8 shows a winning state where three symbols of "2BAR" stand in winning line 14. This winning pattern "2BAR-2BAR-2BAR" is also a predetermined state that causes execution of the secondary game. In this case, one symbol image of "2BAR" is indicated in lower display area 6*a*3 of symbol image display portion 6*a*.

Thereafter, when any of the predetermined states that cause the secondary game to be executed is displayed when the rotation of three reels 4L, 4C, 4R is stopped, the symbol image corresponding to the predetermined state displayed is indicated in display area 6*a*1, 6*a*2, 6*a*3 of symbol image display portion 6*a*. If there is a symbol image already being indicated in the corresponding display area, the new symbol image is additionally indicated to the right side the previously indicated symbol image. Thus, the symbol images are indicated one-by-one successively and horizontally in each display area. When any one of the display areas is filled with a predetermined number of the symbol images, so as to reach a win (goal) of the secondary game, a predetermined number of coins are paid out.

The coin allotment is determined in response to the symbol image of each display area 6_a_1, 6_a_2, 6_a_3. For example, the coin allotment as to the symbol image "7" is preset as 500, the coin allotment as to the symbol image "3BAR" is preset as 100, and the coin allotment as to the symbol image "2BAR" is preset as 50, respectively. Accordingly, there are indicated "500," "100," and "50" in the upper, middle and lower display portions 6_b_1, 6_b_2 and 6_b_3 of allotment display portion 6_b_, respectively.

Figure 9:
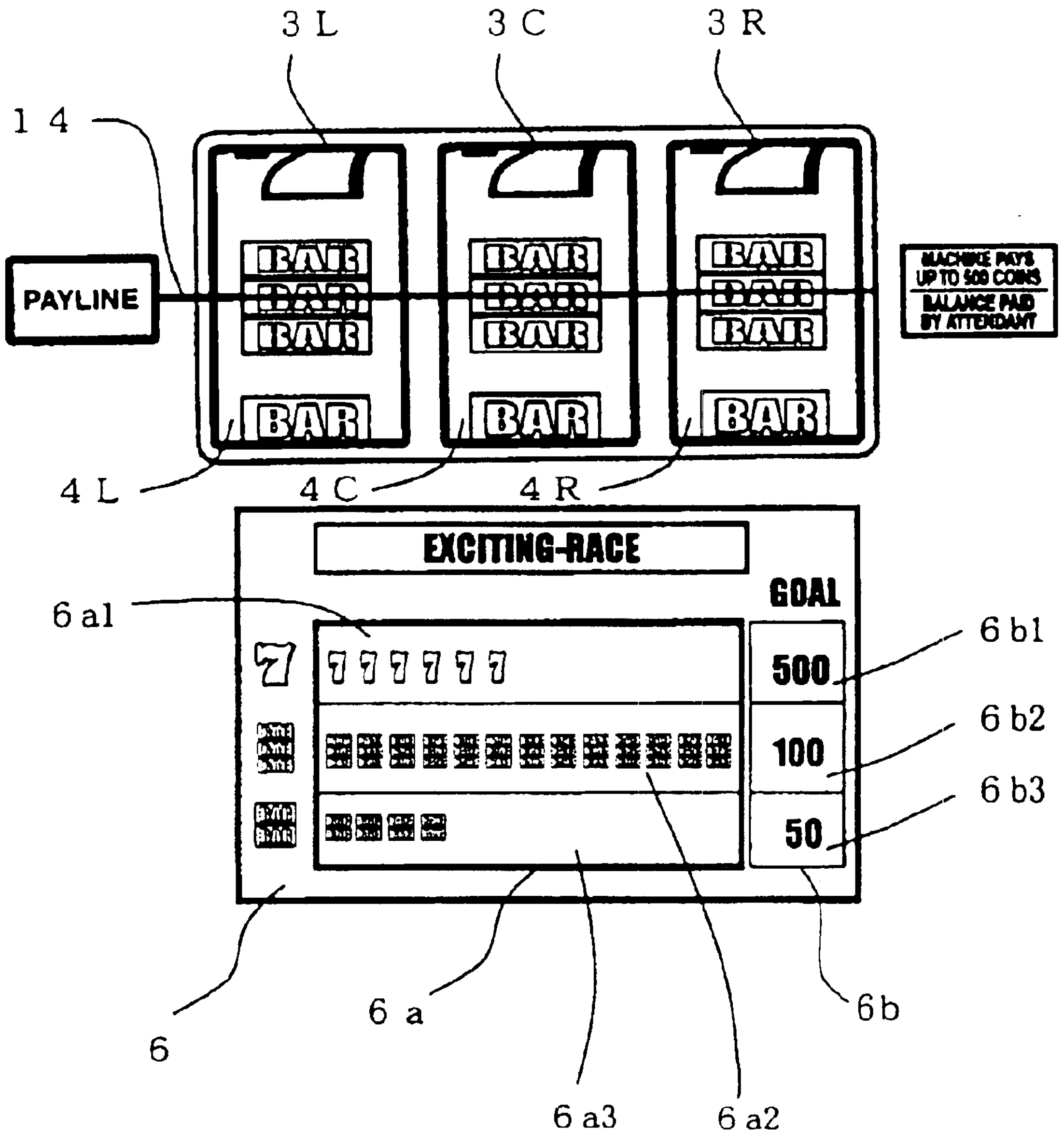
FIG. 9 is a representation that illustrates a predetermined winning state that employs the symbol "3BAR" at the time the variable display has been stopped, and an indication of the predetermined state as a symbol image "3BAR" in the second symbol image display portion of the liquid crystal display device, where the second symbol image display portion of the liquid crystal display device is filled with "3BAR" symbol images.

FIG. 9 illustrates a state where three "3BAR" symbols stand in winning line 14 and a plurality of the "3BAR" symbol image is displayed in middle display area 6_a_2 in sufficient number to fill display area 6_a_2 with the "3BAR" symbol images. This condition corresponds to a win of the secondary game. In this case, 100 pieces of coins are paid out.

As mentioned above, the player can enjoy the secondary game as "race game" in which each symbol image competes toward a goal at the right-hand end of each display area.

Further, to the extent that the player plays the principal game repeatedly, the symbol images of the secondary game continue to be indicated until the secondary game is completed. Accordingly, the player can see from the secondary display the history of appearance of each winning state and also recognize what kind of winning pattern of the principal game is close to causing a win of the secondary game.

Figure 10:
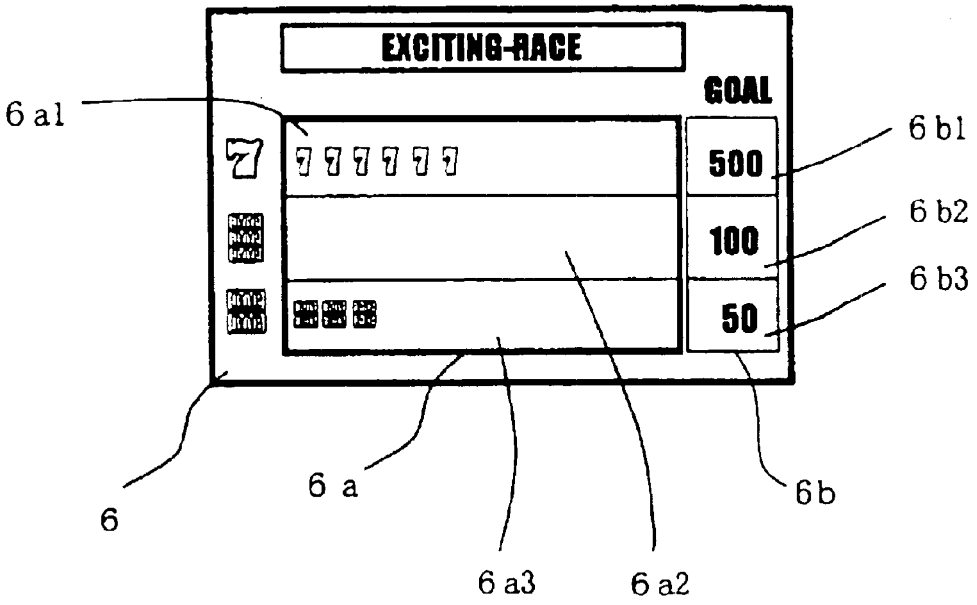
FIG. 10 is a representation that illustrates a state of the screen of the liquid crystal display device after execution of reset operation of a "one area clear system;"
Figure 11:
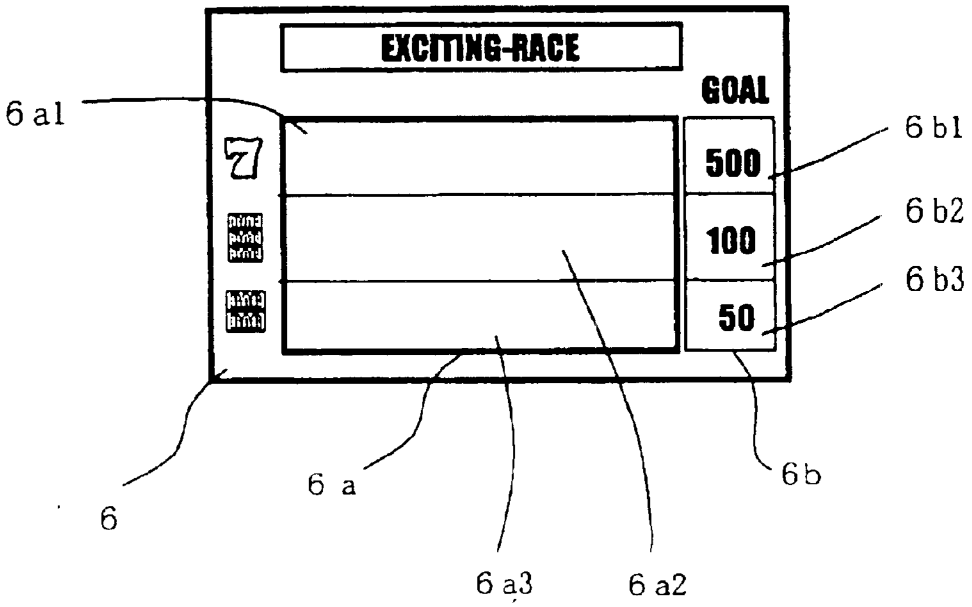
FIG. 11 is a representation that illustrates a state of the screen of the liquid crystal display device after execution of reset operation of "all area clear system;"

FIGS. 10 and 11 show symbol image display portion 6_a_ after a reset operation has been executed after a win of the secondary game.

FIG. 10 shows the symbol image display portion 6_a_ after execution of reset operation by "one area clear system." In the "one area clear system" only the display area that is filled with symbol images is cleared from the state of being filled with corresponding symbol images to a blank condition. In the case of a win of the secondary game mentioned above, only middle display area 6_a_2 of symbol display portion 6_a_ is filled with symbol images "3BAR." Accordingly, after execution of the reset operation by "one area clear system" as shown in FIG. 10, the symbol images indicated only in middle display area 6_a_2 of symbol display portion 6_a_ disappear.

FIG. 11 shows symbol image display portion 6_a_ after execution of a reset operation in accordance with an "all areas clear system." In the "all areas clear system" all display areas are cleared from the symbol images to blank at the time when the secondary game becomes win. As the result, the symbol display portion 6_a_ has no indication of symbol image at all.

As shown in FIG. 10, after execution of the reset operation in accordance with the "one area clear system," many symbol images are still indicated as to the symbol image "7." Accordingly, even after disappearance of all of the "3BAR" symbol images, expectation of a win of the secondary game can still be present. However, as shown in FIG. 11, after the reset operation in accordance with the "all areas clear system" the player is discouraged by the instant disappearance of all symbol images previously indicated.

Figure 12:
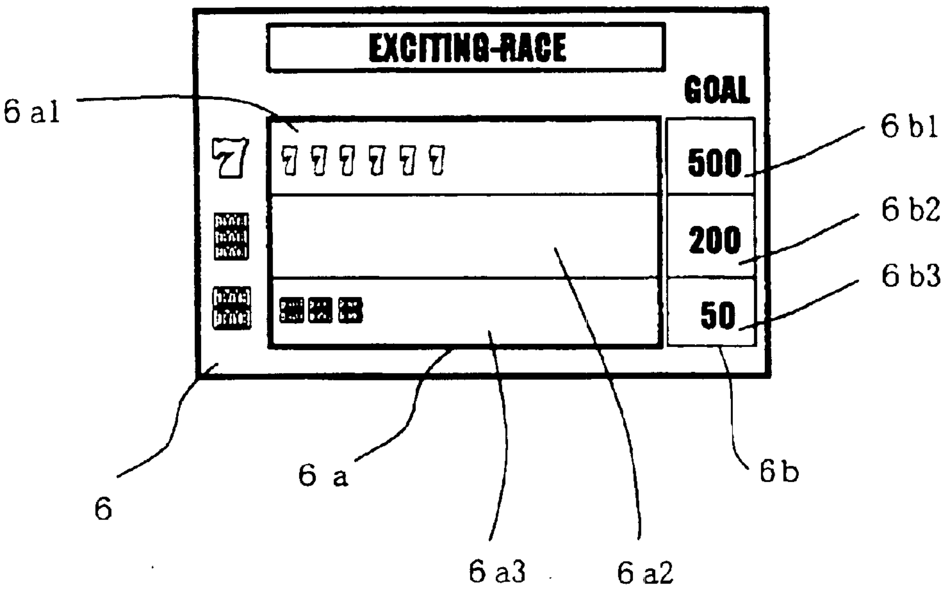
FIG. 12 is a representation that illustrates a change of indication of a coin allotment display portion of the liquid crystal display device in "multiplied allotment system" after execution of a reset operation.

FIG. 12 shows an indication of liquid crystal display 6 in "multiplied allotment system" in which coin allotment is multiplied as to the symbol image with which a display area is filled, after execution of the reset operation.

In the case where display area 6_a_2 is filled with symbol images "3BAR" (FIG. 9), after execution of the reset operation in accordance with the "one area clear system" the indication in middle display portion 6_b_2 (allotment display portion corresponding to symbol image "3BAR") of the coin allotment display portion 6_b_ on liquid crystal display 6 is changed from 100 to 200, that is, a doubling of the number value. Thereafter, each time when the reset operation is executed after display area 6_a_2 is filled with symbol images "3BAR" the indication is changed to "400," then to "800." As to the other symbols, the allotment is changed in the same manner as mentioned above. As to symbol image "7," indication in upper display portion 6_b_1 of coin allotment display portion 6_b_ is changed from 500 to 1000. As to symbol image "2BAR," indication in lower display portion 6_b_3 of coin allotment display portion 6_b_ is changed from 50 to 100.

Figure 13:
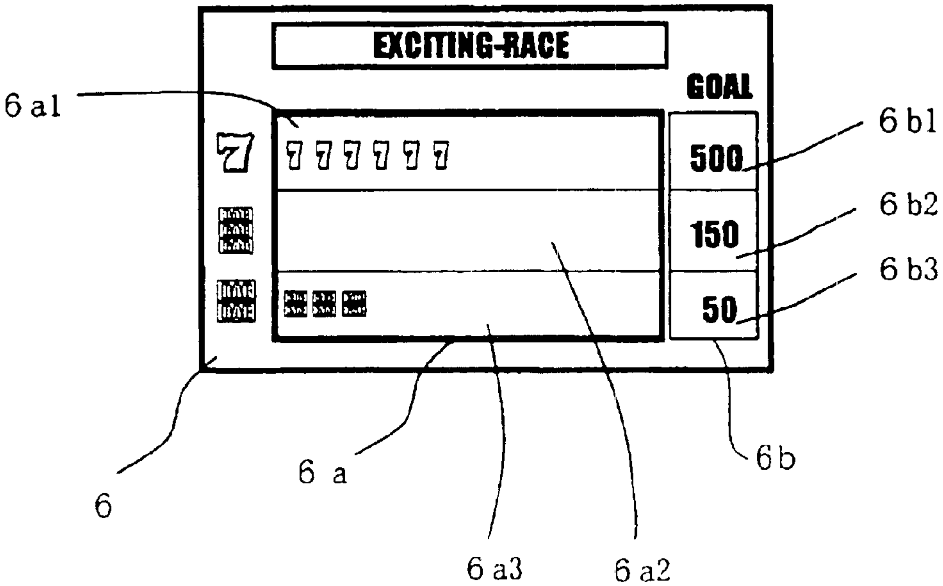
FIG. 13 is a representation that illustrates a change of indication of a coin allotment display portion of the liquid crystal display device in "added allotment system" after execution of a reset operation.

FIG. 13 shows an indication of liquid crystal display 6 in "added allotment system" in which coin allotment is added by a predetermined number as to the symbol image, with which a display area is filled, after execution of the reset operation.

After execution of the reset operation in accordance with the "one area clear system" as mentioned above, the indication in middle display portion 6_b_2 of coin allotment display portion 6_b_ on liquid crystal display 6 is changed from 100 to 150. That is, the indication becomes a value produced by adding 50 to the previous value. Thereafter, each time that the reset operation is executed after display area 6_a_2 is filled with "3BAR" symbol images, the indication is changed to "200," and then to "250." That is, a new value is produced by adding 50 to each previous value. As to the other symbols, the allotment is changed in the same manner as mentioned above. As to symbol image "7," the indication in upper display portion 6_b_1 of coin allotment display portion 6_b_ is changed from 500 to 550. As to symbol image "2BAR," the indication in lower display portion 6_b_3 of coin allotment display portion 6_b_ is changed from 50 to 100.

As mentioned above, the allotments indicated in display portions 6_b_1, 6_b_2, 6_b_3 of coin allotment portion 6_b_ are respectively increased each time that the secondary game is won. Therefore, the player can easily recognize what kind of symbol image has often been indicated in the past (what kind of winning state has often appeared in the principal game by the reels). In other words, the history of each symbol image can be represented by the indication of coin allotment display 6_b_.

The above-mentioned "multiplied allotment system" or "added allotment system" can also be executed in the reset operation in accordance with the "all areas clear system." Also, the allotment may be limited to a predetermined maximum value, and when the allotment reaches the maximum value after repetition of games, the value of the allotment may be returned to the initial value.

FIGS. 14 to 18 illustrate a further embodiment of the invention. In accordance with this further embodiment, the secondary game is executed when a predetermined state is presented as the stop pattern of the reels of the principal game. Moreover, number of symbol images indicated at once in symbol image display portion 6_a_ is varied in response to each predetermined state that has appeared. Each of FIGS. 14 to 18 shows a display state in display windows 3L, 3C, 3R when the rotation of the reels is stopped, accompanied by an indication of the symbol image in symbol image display portion 6_a_ that corresponds to the display state.

In this embodiment, the principal game is played with the use of rotatable reels 4L, 4C, 4R having attached thereto respective symbol sheets, the symbols that are used in the secondary game having no relation to a winning condition of the principal game, as an alternative to the symbols arranged on the surface of the sheets shown in FIG. 2. For example, one of the two symbols of "2BAR" arranged on reel sheets 4C, 4R of FIG. 2, respectively, is replaced by a symbol ("double 2BAR" mentioned later) prepared for executing the secondary game. Also, one of the two symbols of "3BAR" arranged on reel sheets 4C, 4R, respectively, is replaced by a symbol ("triple 3BAR" mentioned later) prepared for executing the secondary game. Furthermore, one of the two symbols of "7" arranged on reel sheet 4R is replaced by a symbol ("double 7" mentioned later) prepared for executing the secondary game. Corresponding reel sheets are used.

Figure 14:
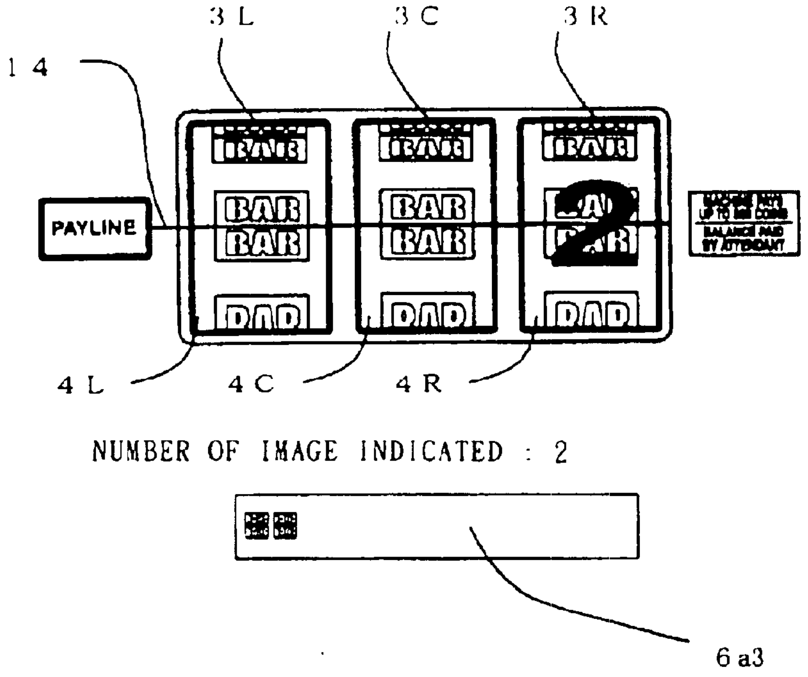
FIG. 14 is a representation that illustrates an indication state of a symbol image display portion of the liquid crystal display device when "2BAR-2BAR-double 2BAR" are indicated on the winning line.

In FIG. 14, a pattern of "2BAR-2BAR-double 2BAR" is displayed in the winning line 14 of display windows 3L, 3C, 3R. More specifically, in winning line 14 of display windows 3L, 3C, 3R is arranged a combination of "2BAR" images including one image of "double 2BAR." In this case, two symbol images of "2BAR" are indicated at once in display area 6*a*3 of symbol image display portion 6*a*.

Figure 15:
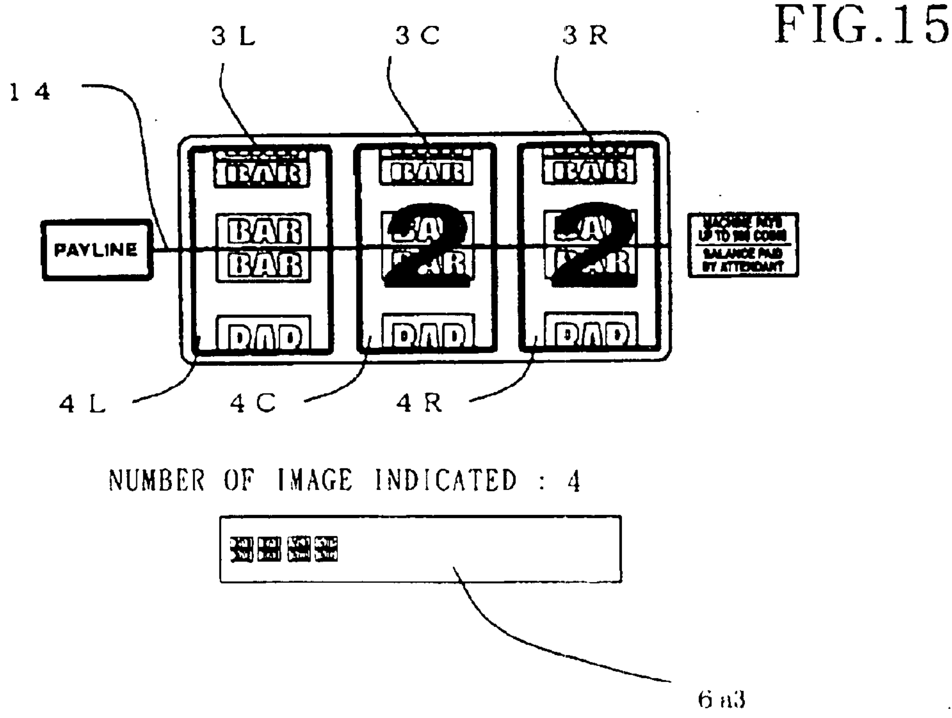
FIG. 15 is a representation that illustrates an indication state of a symbol image display portion of the liquid crystal display device when "2BAR-double 2BAR-double 2BAR" are indicated on the winning line.

In FIG. 15, a pattern of "2BAR-double 2BAR-double 2BAR" is displayed on winning line 14 in display windows 3L, 3C, 3R. More specifically, on winning line 14 in display windows 3L, 3C, 3R is arranged a combination of "2BAR" symbols including two symbols of "double 2BAR." In this case, four symbol images of "2BAR" are indicated at once in display area 6*a*3 of symbol image display portion 6*a*. In other words, symbol image of "2BAR" is indicated as a double number of "double 2BAR" symbols standing on winning line 14.

There will be described below a change of number of symbol images indicated at once in each display area 6*a*1, 6*a*2, 6*a*3 of symbol image display portion 6*a* when a combination of symbol "3BAR" or "7" including symbols prepared for executing the secondary game mentioned above are arranged on winning line 14.

Figure 16:
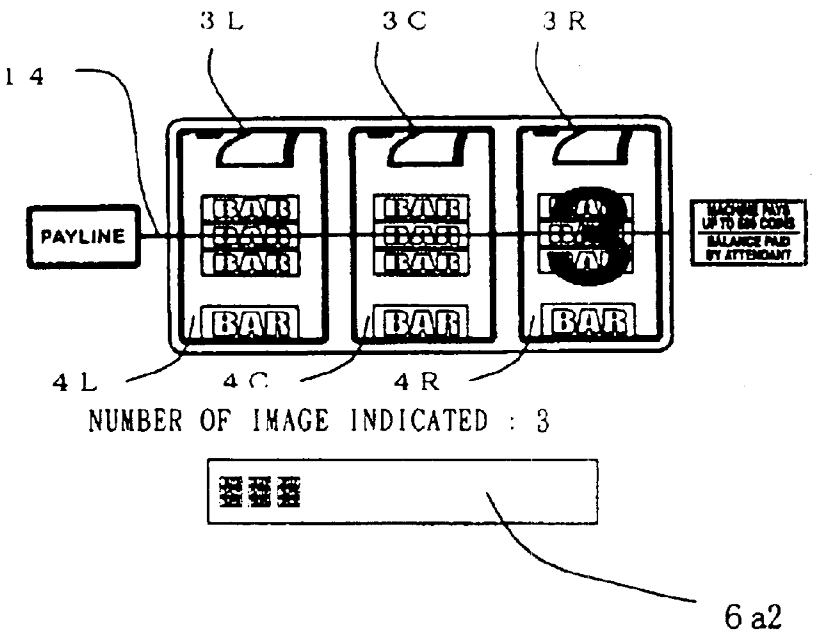
FIG. 16 is a representation that illustrates an indication state of a symbol image display portion of the liquid crystal display device when "3BAR-3BAR-triple 3BAR" are indicated on the winning line.

In FIG. 16, a pattern of "3BAR-triple 3BAR-3BAR" is displayed on winning line 14 in display windows 3L, 3C, 3R. More specifically, on winning line 14 in display windows 3L, 3C, 3R is arranged a combination of "3BAR" images including one image of "triple 3BAR" that is prepared for executing the secondary game. In this case, three symbol images of "3BAR" are indicated in display area 6*a*2 of symbol image display portion 6*a*.

Figure 17:
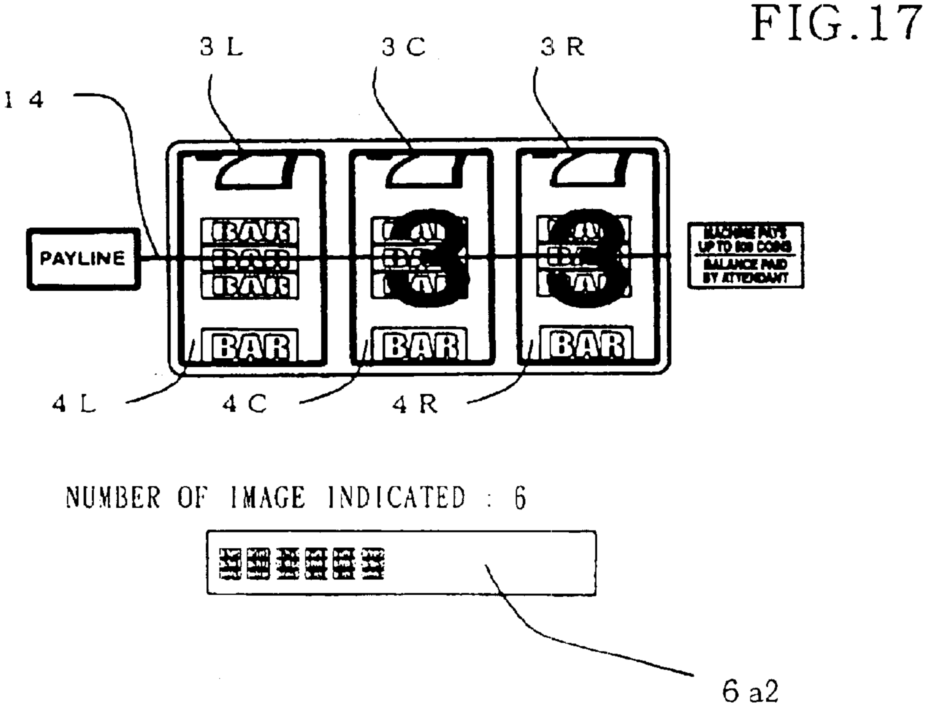
FIG. 17 is a representation that illustrates an indication state of a symbol image display portion of the liquid crystal display device when "3BAR-triple 3BAR-triple 3BAR" are indicated on the winning line.

In FIG. 17, a pattern of "3BAR-triple 3BAR-triple 3BAR" is displayed on winning line 14 in display windows 3L, 3C, 3R. In this case, six symbol images of "3BAR" are indicated at once in display area 6*a*2 of symbol image display portion 6*a*. In other words, a "3BAR" symbol image is indicated of triple number of "triple 3BAR" symbol standing on winning line 14.

Figure 18:
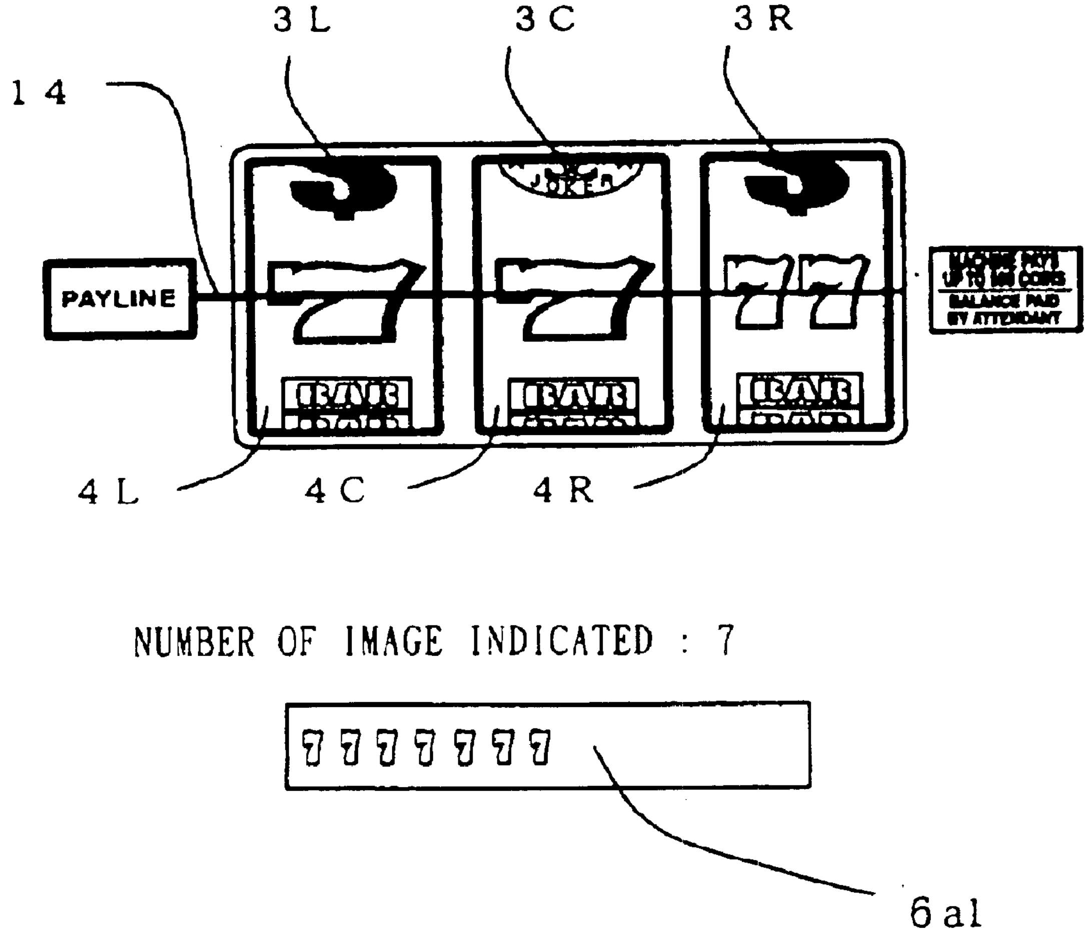
FIG. 18 is a representation that illustrates an indication state of a symbol image display portion of the liquid crystal display device when "7-7-double 7" are indicated on the winning line.

In FIG. 18, a pattern of "7-7-double 7" is displayed on winning line 14 in display windows 3L, 3C, 3R. More specifically, on winning line 14 in display windows 3L, 3C, 3R is arranged a combination of "7" images including one image of "double 7" that is prepared for executing the secondary game. In this case, seven symbol images of "7" are indicated at once in display area 6*a*1 of symbol image display portion 6*a*. If on winning line 14 would be arranged a combination of "7" images including two or more images of "double 7," the symbol image of "7" is displayed 7 times the number of "double 7" symbol standing on winning line 14.

As mentioned above, in the case where symbols such as "double 2BAR," "triple 3BAR," and "double 7" that are advantageous for the secondary game though the symbols have no relation to a win of the principal game, are arranged on the reels, a player can expect a win of the secondary game even if a win of the principal game cannot be obtained.

In addition, each symbol of "double 2BAR," "triple 3BAR," and "double 7" may be determined so as to generate an allotment corresponding a win in the principal game when a predetermined combination of the symbol with the other symbols is appeared in the principal game, though each symbol was determined to have no relation to a win of the principal game in the above-mentioned example.

Furthermore, the secondary game is quickly advanced by increasing the number of symbol images indicated at once in the secondary game screen, thereby increasing the frequency of wins of the secondary game. As a result, the player does not tire of the secondary game and can maintain a feeling of expectation with respect thereto. Also, the amount of awarded profit given to the player is increased in the case of a predetermined state, that has a low probability of appearing in the principal game, illustratively the winning pattern "7-7-7," by increasing the number of symbol images indicated at once in the secondary game screen.

Though the above-mentioned embodiment is directed to a slot machine, the present invention may be applied to a video poker (a gaming machine) that is provided with a variable display for performing a poker game.

For example, when a winning combination of card symbols of a poker game such as "three of a kind," "full house," "straight flush," or the like is displayed in variable display portion, corresponding to the combination displayed, a symbol image such as "2BAR," "3BAR," "7," or the like is indicated in display area 6*a*1, 6*a*2, 6*a*3 of symbol image display portion 6*a*. Further, as a condition to playing the secondary game, without utilizing a winning combination of card symbols of poker game, a specific combination of card symbols may be determined.

Figure 19:
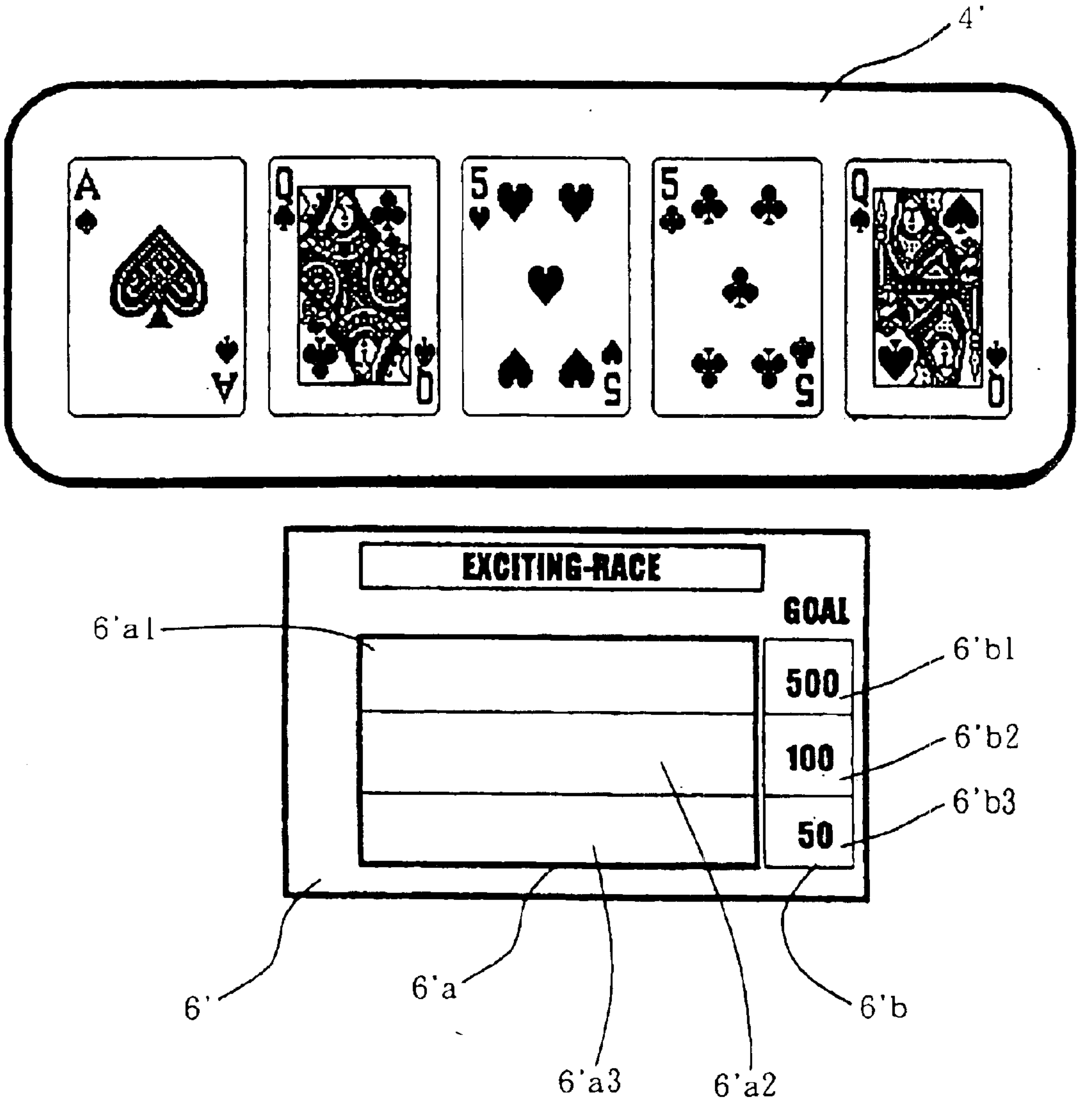
FIG. 19 is a representation of a further embodiment that illustrates a variable display for a poker game and a liquid crystal display device therefor.

FIG. 19 illustrates a front view of display elements formed as a video screen 4' of a variable display that displays graphical elements for a poker game and liquid crystal display 6' for executing a secondary game. Although five cards of Ace of spade, Queen of clubs, 5 of heart, 5 of club and Queen of spade are indicated in video screen 4' when variation action of the variable display is stopped, the combination of these five cards does not correspond to a winning combination of the poker game. Also, the combination displayed as the result of the poker game is not predetermined as a combination that is to execute the secondary game. As shown in FIG. 19, no symbol image is indicated in any of display areas 6'*a*1, 6'*a*2, or 6'*a*3 of display portion 6'*a* of liquid crystal display 6'. Each time that the poker game results in a state that shows a combination of five cards that has been predetermined to execute the secondary game, a symbol image corresponding to the card combination shown is indicated additionally one-by-one in the corresponding display area until the display area is filled with the symbol images. In this embodiment, when any one of the display areas is filled with the symbol images, the secondary game is completed. Moreover, if a special combination of card symbols other than the mentioned above is displayed, the number of symbol images indicated at once in each display area 6'*a*l, 6'*a*2, 6'*a*3 may be changed.

As described above, the secondary game played on the secondary display screen is separate from the variable display that displays the principal game, but is related to the result of the principal game, thereby enhancing the player's interest in continuing to play the entire game. The secondary game on the secondary display screen proceeds while indicating histories of the (winning) states displayed in the past by the variable display. Therefore, the player can know whether the completion of the secondary game is near or not. Also, it is easy for the player to know at glance what kind of (winning) pattern has to be displayed in the principal game for completion of the secondary game so that the player may play the game with high interest and expectation. The player can endeavor to win the principal game by paying attention to the progress of the secondary game, thereby greatly elevating the player's interest in the game.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A gaming machine for use by a player, the gaming machine comprising:

- a variable display for displaying graphical information corresponding to at least one of a plurality of graphical elements necessary for a principal game, the principal game having associated therewith a plurality of predetermined display states, the predetermined display states corresponding to predetermined combinations of the graphical elements of the principal game;
- a controller coupled to said variable display for causing said variable display to display the graphical information; and
- a secondary display having a plurality of display areas each for displaying a plurality of a corresponding predetermined single kind of symbol image, each such predetermined single kind of symbol image corresponding to a respectively associated one of the plurality of predetermined display states displayed as a result of the principal game, the number of the corresponding predetermined single kind of symbol image displayed in each of the display areas being increased each time that the principal game results in the associated one of the predetermined display states, thereby advancing a secondary game and providing indication of the history of appearance of the associated one of the plurality of predetermined display states.

2. The gaming machine of claim 1, wherein the secondary game is completed when any one of the display areas of said secondary display is filled with a predetermined number of the corresponding predetermined single kind of symbol image.

3. The gaming machine of claim 2, wherein an award is given to a player when the secondary game is completed.

4. The gaming machine of claim 1, wherein a respective predetermined value is assigned to each display area of said secondary display.

5. The gaming machine of claim 3, wherein the completion of the secondary game is responsive to at least one of the display areas of said secondary display becomes filled with the corresponding predetermined single kind of symbol image.

6. The gaming machine of claim 3, wherein said controller is coupled to said secondary display and executes a reset operation of said secondary display when the secondary game is completed.

7. The gaming machine of claim 6, wherein said controller executes a reset operation of said secondary display, after any one of the display areas of said secondary display has been filled with the corresponding predetermined single kind of symbol image.

8. The gaming machine of claim 7, wherein the display area that is filled with the corresponding predetermined single kind of symbol image is cleared to a blank condition in response to the execution of the reset operation.

9. The gaming machine of claim 7, wherein the plurality of display areas of said secondary display is cleared to a blank condition in response to the execution of the reset operation.

10. The gaming machine of claim 7, wherein said controller is arranged to perform a selection between a first reset operation for clearing exclusively the display area of said secondary display that is filled with the corresponding predetermined single kind of symbol image to a blank condition, and a second reset operation for clearing all of the display areas of said secondary display to a blank condition.

11. The gaming machine of claim 7, wherein said secondary display is further provided with an allotment display portion for indicating a first value representing an allotment given to a player by the secondary game for each kind of symbol image, the first value being converted to a new value in response to a selectable one of multiplication and augmentation of the first value by a predetermined number after the reset operation.

12. The gaming machine of claim 1, wherein the principal game includes a selectable one of a slot game and a poker game.

* * * * *